(12) United States Patent
Kawamura et al.

(10) Patent No.: US 6,616,905 B1
(45) Date of Patent: Sep. 9, 2003

(54) DESULFURIZATION OF EXHAUST GASES USING ACTIVATED CARBON CATALYST

(75) Inventors: Kazushige Kawamura, Yokohama (JP); Yoichi Umehara, Yokohama (JP); Dai Takeda, Yokohama (JP); Osamu Togari, Yokohama (JP); Naonori Sonehara, Yokohama (JP); Hiroaki Nishijima, Yokohama (JP); Sachio Asaoka, Yokohama (JP)

(73) Assignee: Chiyoda Corporation, Yokohama (JP)

( * ) Notice: Subject to any disclaimer, the term of this patent is extended or adjusted under 35 U.S.C. 154(b) by 0 days.

(21) Appl. No.: 09/647,680

(22) PCT Filed: Apr. 6, 1999

(86) PCT No.: PCT/JP99/01810

§ 371 (c)(1),
(2), (4) Date: Oct. 3, 2000

(87) PCT Pub. No.: WO99/51337

PCT Pub. Date: Oct. 14, 1999

(30) Foreign Application Priority Data

| Apr. 7, 1998 | (JP) | 10-094584 |
| May 21, 1998 | (JP) | 10-139505 |
| Sep. 3, 1998 | (JP) | 10-249571 |
| Feb. 3, 1999 | (JP) | 11-026127 |

(51) Int. Cl.$^7$ .................... B01D 53/50; B01J 21/18
(52) U.S. Cl. .................. 423/244.01; 423/522; 502/180; 502/514; 502/527.19
(58) Field of Search ............ 423/244.01, 522; 423/215.5; 502/180, 514, 527.19

(56) References Cited

U.S. PATENT DOCUMENTS 4,518,704 A * 5/1985 Okabayashi et al. .......... 502/80
6,106,791 A * 8/2000 Mochida et al. ........... 423/239.1
6,114,273 A * 9/2000 Hayden ...................... 502/180

FOREIGN PATENT DOCUMENTS

| EP | 0614682 A1 | * | 9/1994 |
| JP | 6-385 A | | 1/1994 |
| JP | 6-315614 A | | 11/1994 |
| JP | 10-314586 A | | 12/1998 |
| JP | 10-323565 A | | 12/1998 |

OTHER PUBLICATIONS

Grant & Hackh's *Chemical Dictionary* (5th Ed.) McGraw–Hill Book Co., U.S.A., p. 141; ISBN 0–07–024067–1, 1987.*

Kohl et al. *Gas Purification* (4th ed.) Gulf Publishing Co. Houston TX USA; ISBN 0–87201–314–6, pp. 403–407 (1985).*

* cited by examiner

Primary Examiner—Steven Bos
Assistant Examiner—Timothy C. Vanoy
(74) Attorney, Agent, or Firm—Armstrong, Westerman & Hattori, LLP.

(57) ABSTRACT

Active carbon catalyst for recovering and removing sulfur oxides contained in flue gas by turning them into sulfuric acid by a catalytic desulfurization reaction. Powdery active carbon and fluororesin are kneaded by shearing force before being molded to a desired profile so that the inter-particulate gaps of powdery active carbon particles are made water-repellent. Flue gas preferably flows downwardly through a tower filled with such an active carbon catalyst, which is made to show a honeycomb structure having surfaces running only in a direction parallel to the flow. The activity of the catalyst maintains an enhanced level if dilute sulfuric acid or water is introduced into the active carbon from the top of the tower to cleanse the surface of the active carbon catalyst so that the catalyst layer is prevented from being clogged and contaminated by ashes and soot contained in flue gas.

14 Claims, 3 Drawing Sheets

TRIANGULAR

FIG. 4B

PARALLEL

DESULFURIZATION OF EXHAUST GASES USING ACTIVATED CARBON CATALYST

TECHNICAL FIELD

This invention relates to an active carbon catalyst for recovering and removing sulfur oxides contained in flue gas after transforming them into sulfuric acid by catalytic oxidation and also to a method of flue gas desulfurization by means of such an active carbon catalyst.

BACKGROUND ART

Methods are known for catalytically oxidizing sulfur dioxide gas contained in flue gas in the presence of a catalyst and oxygen at low temperature to eventually turn them into sulfuric acid and recovering the obtained sulfuric acid. Active carbon is the catalyst that is most popularly used with such methods. This is because, if a catalyst comprising ceramic type carriers such as alumina, silica, titania and/or zeolite is used, it does not provide a sufficient level of activity and hence catalytic components such as a metal or a metal oxide have to be carried on it but such catalytic components are prone to be attacked by sulfuric acid generated as reaction product and become dissolved or transformed to lose their catalytic effect so that it is highly difficult to make them stably remain catalytically active for a prolonged period of time. Active carbon, on the other hand, shows a substantive level of activity without carrying catalytic components such as a metal or a metal oxide and the level of activity is maintained for a prolonged period of time so that it is substantially free from the above identified problem.

However, from the viewpoint of using active carbon in a flue gas desulfurization plant running on a commercial basis, commercially available active carbon does not necessarily always maintain a high level of activity and therefore a large volume of active carbon will have to be supplied to constantly achieve the intended desulfurization efficiency. Thus, the use of active carbon will more often than not be costly if compared with other desulfurization processes such as a wet type flue gas desulfurization process. The reason why active carbon cannot maintain a high level of activity is generally believed to be that, while active carbon intrinsically shows a very high level of activity of adsorbing and oxidizing sulfur dioxide gas (hereinafter simply referred to as "activity"), once sulfur dioxide gas is adsorbed by the surface of active carbon and oxidized in the presence of moisture at low temperature, it absorbs moisture to become dilute sulfuric acid, which by turn covers or closes, if partly, the pores of active carbon to interfere with the diffusion of sulfur dioxide gas and the possible contact thereof with the active sites within active carbon so that consequently the active sites within active carbon will not be fully utilized. Thus, there have been proposed various techniques for fully exploiting the high activity level of active carbon by providing active carbon with water repellency so that the generated dilute sulfuric acid may be quickly expelled from the pores of active carbon to maintain the high activity level thereof.

For instance, there is a report in Chem. Eng. Comm. Vol. 60 (1987), p.253 that the rate constant of the reaction of adsorbing and oxidizing sulfur dioxide gas is tripled by spraying a solution of dispersed polytetrafluoroethylene (PTFE) to active carbon having an average grain diameter of 0.78 mm if PTFE is added by 8 to 20%. Japanese Patent Application Laid-Open No. 59-36531 describes that the effect of active carbon of adsorbing and oxidizing sulfur oxide gas is increased by treating active carbon for water repellency and, more specifically, granular active carbon with a grain size of 5 to 10 mm comes to show a remarkably high activity level as catalyst when it is impregnated with a solution of dispersed PTFE and heat treated at 200° C. for 2 hours if compared with untreated granular active carbon.

DISCLOSURE OF THE INVENTION

The inventors of the present invention conducted an experiment as described below in order to examine the effectiveness of the above known methods for improving the catalytic activity of active carbon. Firstly, according to the known techniques of providing active carbon with water repellency, commercially available granular active carbon having a grain size between 2.8 and 4.0 mm was made to be impregnated with PTFE by spraying or immersion to find that the activity was improved to a certain extent and retained for a prolonged period of time if compared with untreated active carbon. However, the improvement of activity to such an extent is not enough in view of the competition of a process using treated active carbon with other desulfurization processes to be adopted in a flue gas desulfurization plant running on a commercial basis and the inventors realized that a further improvement has to be achieved for the catalytic activity of active carbon.

As a result of additional research efforts, the inventors of the present invention came to find that the catalytic activity of active carbon can be effectively improved by providing only the macropores (minute pores with a diameter greater than 5nm) of active carbon with water repellency. More specifically, they found that the catalytic activity of granular active carbon is improved to a large extent by making the granular active carbon impregnated with polystyrene (PS) particles having a sphere equivalent diameter between 10 and 100 nm as water-repellent substance. However, when particles of fluororesin such as PTFE that is more water-repellent than PS are used, they cannot successfully make macropores of active carbon water-repellent by a known technique of impregnating active carbon with a water-repellent substance and making it carry the latter such as the spraying or immersion technique because commercially available fluororesin particles have a relatively large diameter of 100 nm or more. In order to make clear this fact, the inventors of the present invention prepared an active carbon catalyst by causing commercially available granular active carbon to be impregnated with and carry PTFE by means of the spraying or immersion technique using a PTFE-dispersed solution and then analyzed the fluorine distribution profile of the prepared catalyst by means of EPMA. As a result of the analysis, it was found that PTFE particles had not got to the inside of the granular active carbon and only remained adhering to the outer surface of the granules of active carbon. More specifically, since commercially available granular active carbon practically does not have pores with a diameter greater than 1 $\mu$m, it is highly difficult for PTFE particles with a diameter between 0.2 and 0.4 $\mu$m to enter any of the pores of commercially available active carbon. The result of experiment was similar when the PTFE-dispersed solution was replaced by a solution containing PS particles with an average particle diameter of 0.3 $\mu$m in a dispersed state. When the two active carbon catalysts containing respectively the two different types of water-repellent particles were used to test the activity, it was found that the one carrying PTFE particles was slightly more active than the one carrying PS particles, although neither of them did not show the expected level of activity.

The inventors of the present invention further looked into the macropore diameter of active carbon that can most improve the activity of active carbon when the latter is processed for water repellency. Firstly, five different specimens of latex (obtained by dispersing PS particles of relatively similar sizes into water by about 10 wt %) with respective average particle diameters of 10, 28, 55, 102 and 300 nm were prepared. Then, they were diluted to different concentrations between 0.1 and 5 wt % and different granular active carbon samples were immersed respectively into the obtained latex specimens and subsequently dried under reduced pressure to produce so many different active carbon catalysts. As a result, it was found that, among the processed active carbon catalysts, those with PS added by about 1 wt % showed the highest activity regardless of the average diameter of PS particles and that those carrying PS with the average diameter of 28 nm or 55 nm were most active but those carrying PS with the average diameter of 10 nm and 102 nm were slightly less active, whereas those having PS with the average diameter of 300 nm were only slightly more active than unprocessed active carbon catalysts. Fractured PS particles of the sample catalysts with five different PS particle diameters were observed by SEM to find that PS particles with the average particle diameter of 55 nm or less had evenly entered to the inside of active carbon grains whereas PS particles with the average particle diameter of 102 nm were found only near the surface of active carbon grains and those with the average particle diameter of 300 nm were found only on the outer surface of active carbon grains. The reason why the active carbon catalysts carrying PS with the average particle diameter of 10 nm were less active than those carrying PS with the average particle diameter of 28 nm or 55 nm may be that very fine PS particles can clog macropores, although this is a mere speculation. Anyhow, the above experiment suggested that macropores with a diameter greater than the smallest diameter that allows PS particles with an average diameter of 28 nm to enter should be processed to make its macropores water-repellent.

On the basis of the above observations, it was confirmed that the activity of a granular active carbon catalyst can be greatly improved by making its macropores water-repellent, that this activation process is effective when active carbon grains are evenly processed to the inside for water repellency and that fluororesin such as PTFE is more effective than PS for improving the activity of active carbon because the former realizes a higher level of water repellency. Thus, the inventors of the present invention got to an idea of crushing granular active carbon to fine particles, mixing them with fluororesin particles and molding the mixture in view of the fact that commercially available fluororesin particles show a relatively large average particle diameter and cannot effectively make granular active carbon water-repellent simply by impregnating the latter with the former and making the latter carry the former. Then, an experiment was conducted by the inventors of the invention to make both the inter-particulate gaps of powdery active carbon particles (which may be referred to as "large macropores") of the molded product and part of the macropores of the original active carbon water-repellent by means of fluororesin particles. The obtained active carbon catalyst showed a level of activity much higher than both the original active carbon and any active carbon catalysts prepared by impregnating them with and making them carry PS particles.

While the inventors of the present invention used to believe about the conditions under which active carbon is crushed and mixed with fluororesin for molding that the inter-particulate gaps of powdery active carbon particles will be modified to a large extent by PTFE to improve the activity thereof simply by crushing active carbon to fine particles as far as possible and mixing them with a PTFE-dispersed solution. Thus, firstly, they crushed commercially available active carbon to particles with an average particle diameter of 10 $\mu$m and mixed them with a PTFE-dispersed solution to prepare an active carbon catalyst, which was subsequently evaluated for catalytic activity. However, no expected improvement was obtained in the activity when PTFE was added at a varying rate between 2 and 30 wt %. The reason for this was assumed to be that, when active carbon is crushed too far, the inter-particulate gaps of powdery active carbon particles that provide discharge paths for the produced sulfuric acid are extremely narrowed and then totally clogged by PTFE particles. Thus, the rate of adding PTFE was held constant and the average particle diameter of powdery active carbon was varied between 10 and 3,000 $\mu$m to produce various molded catalyst specimens in an attempt of finding an optimal level for the particle size of active carbon particles. As a result, a relatively highly active carbon catalyst could be obtained within a range of average particle diameter of powdery active carbon between 12 and 600 $\mu$m as will be discussed hereinafter.

The inventors of the present invention looked into a possible method of effectively improving the water repellency of macropores in order to produce a highly active catalyst by adding PTFE only at a reduced rate. More specifically, the inventors believed that the water repellency of the catalyst can be effectively improved when the surface of powdery active carbon particles and internal macropores is brought into contact with PTFE over a large area by enlarging the area by which PTFE is projected if PTFE is added at a same rate. Thus, the inventors intended to apply shearing force to active carbon particles and PTFE particles when they are mixed together in order to deform PTFE particles and make them adhere to powdery active carbon extensively so that the surface of powdery active carbon particles and internal macropores may be provided with strong water repellency. Then, PTFE particles were added to powdery active carbon at a rate of 0.5 to 30 wt % in the form of PTFE powder or PTFE-dispersed solution and then they were kneaded by means of a kneader, a roll kneading machine, a calender roll or a roll crusher and molded to obtain an active carbon catalyst. The obtained active carbon catalyst was then used in a desulfurization test to find that an active carbon catalyst containing powdery PTFE to a reduced extent operates well same as an active carbon catalyst obtained by simply mixing active carbon particles and PTFE particles and molding the mixture.

Thus, according to the first aspect of the invention, there is provided an active carbon catalyst to be brought into contact with flue gas containing sulfur oxides in order to adsorb and oxidize said sulfur oxides and produce sulfuric acid to be recovered and removed, inter-particulate gaps being formed by combining/molding powdery active carbon to a predetermined profile, the peripheral wall of said gaps being processed for water repellency. Advantageously, an active carbon catalyst according to the invention contains powdery active carbon with an average particle diameter between 12 and 600 $\mu$m, preferably between 20 and 200 $\mu$m, and fluororesin powder or dispersed solution by 0.5 to 25 wt %, preferably by 1 to 20 wt %, relative to said powdery active carbon and is molded to a predetermined profile after applying shearing force to and kneading the mixture.

In the course of further investigation, the inventors of the present invention came to find that dilute sulfuric acid generated on and in an active carbon catalyst is often not completely discharged from the pores of the catalyst if it has been processed for water repellency. This may be because the dilute sulfuric acid adhering to the surface of catalyst particles is not removed quickly from the reaction vessel and interferes with the possible discharge of dilute sulfuric acid from the pores and the possible contact of flue gas and catalyst particles. If such is the case, the reaction efficiency is reduced as the volume of dilute sulfuric acid increases in the reaction vessel to make it necessary to increase the amount of catalyst within the vessel and baffle any attempt of down-sizing the vessel. Therefore, if the generated dilute sulfuric acid is prevented from remaining on the catalyst and discharged quickly from the reaction vessel, the contact efficiency of flue gas and the catalyst and hence the reaction efficiency thereof can be improved to make it possible to reduce the necessary amount of catalyst.

Thus, according to the second aspect of the invention, there is provided a method of removing flue gas containing at least sulfur dioxide gas, oxygen and moisture by causing it to contact with a catalyst and turn said sulfur dioxide gas into dilute sulfuric acid, said flue gas being made to flow downwardly through the catalyst.

When flue gas is made to flow through a tower filled with active carbon to be brought into contact with flue gas, there arises another problem that a layer of granular active carbon filled in the tower is not economically feasible when used in an flue gas desulfurization plant designed to treat flue gas at a high rate because of a significant pressure loss that occurs there. If the diameter of the tower is increased to reduce the pressure loss, the plant requires large premises and it becomes difficult to evenly and uniformly distribute gas within the tower. In an attempt of reducing the pressure loss of an flue gas desulfurization plant, there have been proposed honeycomb structures including those produced by molding and baking active carbon or some other carbon material, using resin such as petroleum pitch or polypropylene as binder and those made of metal to which active carbon is made to adhere. Some of such structures are commercially available.

However, it is difficult and costly to produce a large honeycomb structure by molding and baking active carbon because of the strain that appears during the baking process. On the other hand, a honeycomb structure made of metal to which active carbon is made to adhere is poorly durable when exposed to flue gas containing corrosive sulfur dioxide gas because the metal of the structure is normally aluminum. Additionally, while the technique of molding a mixture of powdery active carbon and a water-repellent material such as resin, fluororesin in particular, is effective to provide the surface of powdery active carbon with water repellency, a product obtained by extrusion-molding or pressure-molding such a mixture does not provide a sufficient strength for a honeycomb structure. In view of these facts, there is a demand for a method of manufacturing a honeycomb structure containing active carbon and having a sufficient strength without difficulty.

Thus, according to the third aspect of the invention, there is provided a method of manufacturing an active carbon catalyst having a honeycomb structure by kneading a mixture of active carbon and resin and molding the mixture to a plate-like or pillar-like preform and by processing said preform into a honeycomb structure.

Then, there arises still another problem that combustion flue gas of boilers can contain ashes and soot in addition to sulfur oxides such as sulfur dioxide gas depending on the properties of the fuel used in the boiler. This problem also has to be taken into consideration. When a wet system is used for desulfurizing flue gas and sulfur dioxide gas is absorbed by an absorbent solution that is brought into gas/liquid contact with flue gas, ashes and soot will be caught by the absorbent solution along with sulfur dioxide gas so that the both can be removed simultaneously. However, in the case of a dry system, ashes and soot will have to be removed prior to the desulfurization process because, if the solid catalyst is used to catch ashes and soot, the catalyst layer can become clogged by ashes and soot and/or its desulfurization effect can become degraded as the catalyst surface is eroded. While devices for removing ashes and soot include electrostatic precipitaters and gas cleaning towers, the use of such a device is disadvantageous in terms of cost and space. Thus, there is a demand for a desulfurization method for treating flue gas by bringing it into contact with a solid catalyst that does not require the use of an additional dust catching apparatus or, if does, requires only a remarkably down-sized and energy-saving apparatus even if flue gas contains ashes and soot in addition to sulfur oxides.

Thus, according to the fourth aspect of the invention, there is provided a method of simultaneously removing sulfur dioxide gas and ashes and soot contained in flue gas by bringing flue gas containing at least sulfur dioxide gas, oxygen, moisture and ashes and soot into contact with a solid catalyst, the surface of said catalyst being brought into a wet state by dilute sulfuric acid containing at least as part thereof aqueous sulfuric acid solution produced on said catalyst from sulfur dioxide gas, oxygen and moisture contained in flue gas.

BEST MODE FOR CARRYING OUT THE INVENTION (1) Preparation of Water-repellent Active Carbon Catalyst An active carbon catalyst according to the invention is used for recovering and removing sulfur dioxide gas contained in flue gas by oxidizing it into sulfuric acid by means of oxygen also contained in flue gas. It can be obtained by applying shearing force to particles of highly water-repellent fluororesin and powdery active carbon with particle sizes found within an appropriate range, kneading the mixture thoroughly and molding the mixture.

A first important factor that takes a significant role for improving the activity of a catalyst by providing it with water repellency according to the invention is that powdery active carbon and fluororesin particles are subjected to shearing force and kneaded well. According to the invention, fluororesin that is a water-repellent substance is made to adhere to powdery active carbon to make the latter water-repellent. Thus, the prepared catalyst effectively shows water repellency when the surface that is required to be water-repellent is covered extensively by fluororesin. If a same amount of fluororesin is used, the entire active carbon catalyst can be made highly water-repellent when fluororesin particles are remarkably deformed to enlarge the area by which they are projected and made to adhere to the surface of powdery active carbon extensively or enter deep into macropores of active carbon under pressure. Thus, applying sufficient shearing force to the mixture of powdery active carbon and fluororesin particles constitutes an essential factor in the present invention. While a desired effect can be achieved normally by kneading the mixture with a power of more than 0.5 W, preferably more than 1 W, per 1 g of the mixture for more than 10 minutes, the kneading conditions cannot be defined unequivocally in terms of the rate of supplying kneading energy because the rate may vary depending on other factors. In short, kneading energy may well be supplied at a rate sufficient for deforming fluororesin particles and making them adhere to the surface of powdery active carbon extensively or enter deep into macropores of active carbon under pressure. As an effect of applying shearing force to the mixture by kneading it, the inter-particulate gaps of powdery active carbon particles of the active carbon catalyst produce large macropores that are evenly and uniformly endowed with water repellency from the very surface of the particles of the catalyst to the deep inside thereof. Additionally, part of the macropores found in individual active carbon particles are also made water-repellent. Still additionally, part of the fluororesin particles that have not been deformed by the kneading also enter into the macropores of active carbon particles to increase the water repellency of the catalyst.

The differences of activity observed among different types of active carbon will be reduced when used for an active carbon catalyst according to the invention so that the present invention provides a wide choice, although active carbon showing an enhanced level of activity as catalyst should be selected. In an experiment conducted by the inventors of the present invention to compare the activity levels of various different types of active carbon, active carbon principally made of coal tended to show a level of activity higher than its counterpart principally made of coconut shells, beet or petroleum pitch. While the reason why active carbon principally made of coal shows a high level of activity is not clear, it may be assumed to be that the disadvantage of active carbon made of coal of being too lowly hydrophobic to produce a desired high level of activity is eliminated by the process for water repellency so that the advantages of active carbon made of coal including a large number of sulfur dioxide gas adsorbing/oxidizing sites relative to other types of active carbon become apparent. However, it should be noted that an active carbon catalyst according to the invention shows an improved activity level if compared with an active carbon catalyst prepared simply from active carbon or by mixing active carbon and fluororesin particles and molding the mixture regardless of the type of active carbon involved. Active carbon that has been subjected to a preliminary treatment process such as baking may also be used for the purpose of the invention.

A second important factor that takes a significant role for improving the activity of a catalyst by providing it with water repellency according to the invention is that the particle size of powdery active carbon to be used as starting material is regulated. If the particle size of powdery active carbon is too large, it is impossible to realize an enhanced level of activity regardless of the rate of adding fluororesin. If, conversely, the particle size of powdery is too small, the inter-particulate gaps of powdery active carbon that operate as discharge flow paths for generated sulfuric acid become extremely small and clogged by fluororesin so that consequently the activity of the catalyst can be quickly reduced during the use. According to the findings of the inventors of the present invention, the average particle diameter of powdery active carbon should be found within a range between 12 and 600 $\mu$m, preferably between 20 and 200 $\mu$m, for achieving an enhanced level of activity. While powdery active carbon may normally be prepared by crushing granular active carbon, inactivated coal may alternatively be crushed and kneaded with fluororesin particles before the kneaded mixture is molded and activated.

Any of commercially available various particulate fluororesin products may be used as powder or latex (obtained by dispersing fluororesin particles into water) before it is kneaded with powdery active carbon. Resin containing fluorine to a large extent may advantageously be used because it provides excellent water repellency. Preferable fluororesins that can be used for the purpose of the invention include polytetrafluoroethylene (PTFE), perfluoroalcoxy resin (PFA), tetrafluoroethylene hexafluoropropylene copolymer (FEP) and chlorotrifluoroethylene resin (PCTEF). Any of these fluororesins shows a level of water repellency higher than both polystyrene and polyethylene and particles of any of such fluororesins that are commercially available are relatively large with an average particle diameter between 0.2 and 0.4 $\mu$m and hence do not enter micropores of powdery active carbon so that it is possible to obtain a desired active carbon catalyst by mixing such particles with powdery active carbon and kneading the mixture, wherein both the inter-particulate gaps of powdery active carbon particles (large macropores) and the internal macropores of powdery active carbon are made water-repellent.

A third important factor that takes a significant role for improving the activity of a catalyst by providing it with water repellency according to the invention is the rate at which fluororesin particles are added to active carbon. An active carbon catalyst according to the invention shows a desired level of activity when it contains fluororesin by 0.5 to 25 wt %, preferably by 1 to 20 wt %, relative to powdery active carbon regardless of the average particle diameter of powdery active carbon. Since fluororesin operates as binder in the molding process, the rate at which fluororesin is added is desirably determined by taking the binding effect of fluororesin into consideration. If the rate of adding fluororesin is low from the viewpoint of binding effect, an additional binding agent may be used for the molding process.

Various molding techniques including extrusion molding, stamp molding and rolling granulation may be used for the process of molding a kneaded mixture of powdery active carbon and fluororesin. For instance, stamp molding of forming a product to show a predetermined shape by applying pressure to a powdery mixture of active carbon and fluororesin may preferably be used for obtaining an active carbon catalyst showing an enhanced strength. Or such a powdery mixture may be molded to show a plate-like or honeycomb-like shape for suppressing generation of pressure difference due to accumulation of soot contained in flue gas. Thus, according to the invention, an active carbon catalyst can be prepared from powdery active carbon to show any desired profile to make it advantageous not only in terms of improved activity but also in terms of manufacturing cost.

If necessary, the molded product may be crushed to particles that show an appropriate particle size and subsequently subjected to a process of providing them with water repellency. Then, the outer surface of the active carbon catalyst will become strongly water-repellent to prevent water film from being formed on the surface, prevent closure by liquid of macropores from taking place and block steam and/or any aqueous solution from entering the catalyst from outside. Thus, the active sites inside the catalyst can be effectively utilized to make the catalyst perform excellently. For the purpose of the invention, an active carbon catalyst can be made water-repellent by impregnating the molded catalyst product with a solution containing fine particles of a water-repellent substance in a dispersed state or a solution obtained by dissolving a water-repellent substance into an organic solvent such as toluene by means of spraying or immersion. Fluororesin is most preferably used as water-repellent substance particularly in terms of adherence and water repellency. When an organic solvent is used, the water-repellent substance to be dissolved in it is preferably a polymer having a molecular weight greater than ten thousands. The active sites of the molded catalyst may unnecessarily be covered by the water-repellent substance to reduce the number of effective active sites if the water-repellent substance has a molecular weight smaller than that. The catalyst will be impregnated by a water-repellent substance by 0.1 to 3.5 wt %, preferably by 0.2 to 3 wt %.

(2) Downward Flow of Flue Gas

In a desulfurization reactor filled with a catalyst according to the invention, it is desirable that flue gas is made to flow downwardly relative to the catalyst layer so that dilute sulfuric acid adhering to the surface of the catalyst may be forced to flow downward. Since dilute sulfuric acid is forced to flow downward along the surface of the catalyst, it is desirably that flue gas flows near and in parallel with the surface of the catalyst and shows a large flow rate on the surface of the catalyst. The gas phase oxidation reaction using a catalyst is generally a gas diffusion controlled reaction with which the removing efficiency is converged to a certain level when the actual gas flow rate (the flow rate of gas passing through the space within the catalyst layer) rises above a gas flow rate region (0.05 to 1.0 m/s) where the diffusion of gas components to be treated will be affected. However, it was found by the inventors of the present invention that, in the case of catalytic oxidation process for removing sulfur dioxide gas after turning it into dilute sulfuric acid, the efficiency of removing sylfur dioxide is improved even above the gas flow rate region. While the dimensions of the plant can be reduced when a high gas flow rate region is used, an excessively high gas flow rate, specifically a gas flow rate exceeding 40 m/s, does not provide any effect on improving the performance of removing sulfur dioxide gas and is not desirable because of a hiked pressure loss and an increased volume of catalyst necessary for the plant. All in all, the gas flow rate passing on the surface of the catalyst should be found between 1 and 15 m/s.

Figure 3:
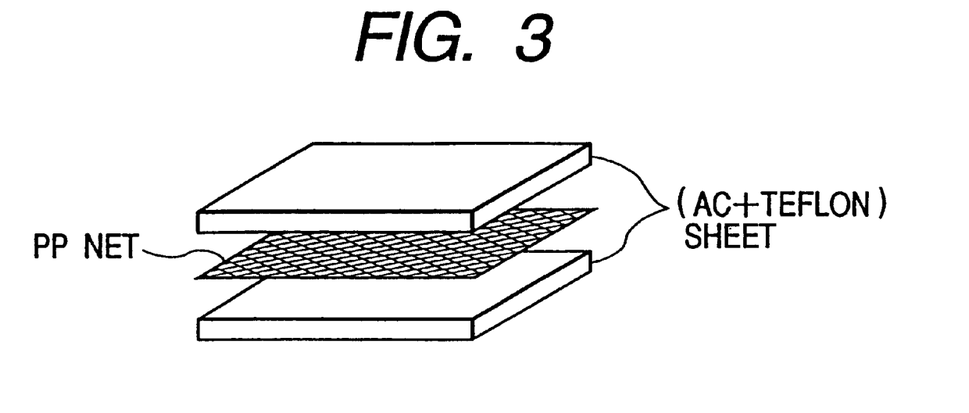
FIG. 3 is an exploded schematic perspective view of a plate-like catalyst that can suitably be used for a method according to the invention.
Figure 4A:
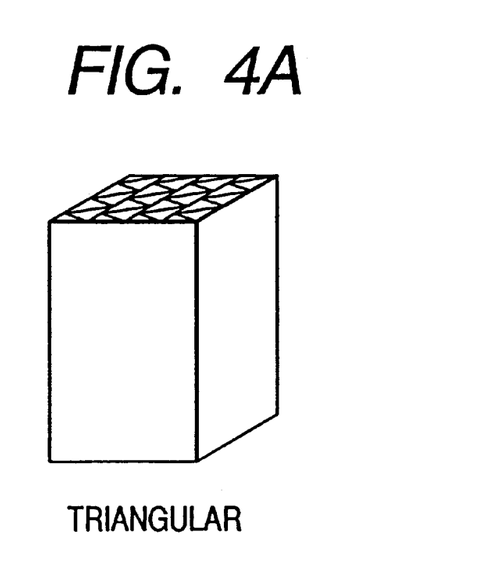
FIGS. 4A and 4B are schematic perspective views of two catalysts having different profiles and prepared by using a plate-like catalyst as shown in FIG. 3.
Figure 4B:
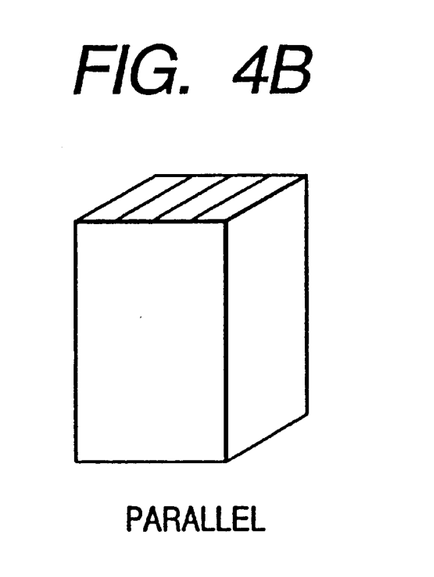

An increased gas flow rate on the surface of the catalyst does not necessarily means a rise in the overall gas flow rate because gas may be made to flow at a flow rate higher than any other area within the reaction vessel only on the surface of the catalyst. In other words, what is necessary here is to produce a flow pattern that provides a high gas flow rate along the surface of the catalyst. Such a flow pattern can be realized by using a catalyst having a profile with one or more than one planes running in parallel with the direction of the flow of flue gas such as a quasi-honeycomb profile extending in the direction of the flow, a quasi-quadrangle profile or a quasi-triangle profile. For convenience sake, in this specification, all structures having those profiles are inclusively referred to as honeycomb structure. Such a molded catalyst is advantageous because it has one or more than one continuous planes so that dilute sulfuric acid can flow smoothly and flue gas flowing at a high rate may not encounter any significant resistance. Additionally, according to the findings of the inventors of the invention, the use of a water-repellent catalyst is advantageous because dilute sulfuric acid on the surface of the catalyst can easily be forced to flow by flue gas. Hence, an active carbon catalyst according to the invention and subjected to a process for water repellency in a manner as discussed earlier will advantageously be used particularly in view of the fact that its activity is improved by the process. A catalyst having a quasi-honeycomb profile can appropriately be produced by extrusion molding or pattern-draw molding. A suitable method for manufacturing a highly active lightweight active carbon catalyst showing an enhanced strength uses powdery active carbon, a water-repellent substance and a reinforcement material. More specifically, a mixture of powdery active carbon and the water-repellent substance is kneaded and then molded to a sheet-like catalyst, which is then applied to one or both of the opposite sides of a reinforcement material made of an acid-proof metal or an organic material and shaped to a plate or network, using, if necessary, a material for enhancing the adhesiveness therebetween. The obtained product may be processed to show a desired form such as a corrugated form or a block-like form. FIG. 3 is an exploded schematic perspective view of a sheet-like catalyst applied to the opposite surfaces of a reinforcement member. FIG. 4A is a final product obtained by arranging such layered products to show a triangular cross sectional view and FIG. 4B is a final product obtained by arranging such layered products in parallel.

With a desulfurization method according to the invention, dilute sulfuric acid in the reaction vessel (adhering to the surface of the catalyst) is quickly removed by causing flue gas to flow downwardly through the catalyst. It has been found that the desulfurization efficiency of the method is improved when the catalyst surface is cleansed with a dilute aqueous solution of sulfuric acid. Although the reason for this is not clear, a speculation of the inventors will be described below. If the surface is not cleansed, flue gas from a boiler using coal as fuel produces dilute sulfuric acid with a concentration of about 23% on the surface of the catalyst when flue gas is thermally insulated and cooled and the produced dilute sulfuric acid is removed from the reaction vessel by downwardly flowing gas. However, when the catalyst surface is cleansed by a more dilute aqueous solution of sulfuric acid (e.g., with a concentration of about 5%), the produced sulfuric acid is diluted and partly loses its viscosity to make it to be easily removed by the gas flow and, at the same time, sulfur dioxide gas and oxygen are dissolved in the cleansing solution to get to the catalyst surface (in other words, a sort of wet oxidation proceeds simultaneously). The catalyst surface can be cleansed by bringing back part of the cleansing solution from the exit of the reaction vessel to the entrance thereof to make the solution circulate. The circulation of the cleansing solution is preferably so arranged that its flow rate is found between 0.02 and 2 m$^3$/h per 1 m$^2$ of the catalyst layer in the case of continuous cleansing. The flow rate may be increased in the case of intermittent cleansing. The concentration of sulfuric acid of the cleansing solution (aqueous solution of sulfuric acid) should be less than 20%, preferably 5%.

(3) Preparation of a Molded Honeycomb Structure

An active carbon catalyst according to the invention is preferably molded to show a quasi-honeycomb structure extending in the direction of the flow of flue gas because all the planes of such a structure run in parallel with the direction of the gas flow and the planes can be arranged densely. For preparing a molded honeycomb structure, firstly a mixture of active carbon and resin is kneaded well and molded to a plate-shaped or pillar-shaped preform by means of extrusion molding or pressure molding using a roll machine or a press machine. A preform showing a satisfactory level of strength can be prepared by kneading the mixture of active carbon and resin thoroughly. While the reason why the strength of the preform is enhanced by such a thorough kneading is not clear, the inventors presume that resin particles, particularly molecules of fluororesin, are entangled with each other strongly in a complicatedly fashion to produce a three-dimensional structure by such a kneading operation. The mixing and kneading operation is typically conducted by means of a pressure kneader or a Banbury mixer but other means that can effectively apply shearing force and compressive force to the material to knead it well may also be used.

For preparing a mixture of active carbon and resin, firstly powdery active carbon and resin are mixed tightly. The powdery active carbon preferably has a average particle diameter between 10 and 1,000 $\mu$m. If the average particle diameter is lower than this range, the kneaded and molded product will be too dense and the inter-particulate gaps of the molded product will become too minute. If, on the other hand, the average particle diameter is higher than this range, the inside of the macropores of the product will not be made sufficiently water-repellent and the inter-particulate gaps of the molded product will become too large so that the product may come to have a reduced surface area. Thus, the average particle diameter is found preferably between 15 and 400 $\mu$m, more preferably between 20 and 300 $\mu$m, powdery active carbon may be categorized into the coal type, the coconut shell type and the petroleum pitch type depending on the original material thereof. While active carbon of the coal type generally shows a high activity, any type of active carbon can be used for the purpose of the invention. Additionally, powdery active carbon particles that are carried by metal or baked may be used for the purpose of the invention.

Meanwhile, the resin to be used for the purpose of the invention is advantageously fluororesin from the viewpoint of water repellency it can provide, although the present invention is not limited thereto. Fluororesins that can suitably be used for the purpose of the invention include polytetrafluoroethylene (PTFE), perfluoroalcoxy resin (PFA), tetrafluoroethylene hexafluoropropylene copolymer (FEP) and chlorotrifluoroethylene resin (PCTEF). Such fluororesins are commercially available in the form fine particles of regulated particle sizes that are dispersed in a solution. Thus, such a solution containing dispersed fine particles of fluororesin and powdery active carbon are mixed and then kneaded thoroughly. Thereafter, the mixture is molded to produce a plate-shaped or pillar-shaped preform typically by extrusion, rolling or punching. Fluororesin is highly water-repellent and hence stably provides the surface of the kneaded and molded product with water repellency. Additionally, the strength of the preform is improved when the mixture is kneaded thoroughly. A desirable molded catalyst can be prepared by adding resin by 1 to 20 wt %, preferably by 2 to 20 wt %.

While the kneaded mixture may be molded to a plate-shaped or pillar-shaped preform or even to a honeycomb structure without using any additive, the use of an additive is preferable to improve the workability of the mixture. For the purpose of the invention, water-soluble polymers and rubber molding additives may preferably be used as additive. Water-soluble additives that can be used for the purpose of the invention include water-soluble starches, gum Arabic, gelatin, carboxymethylcellulose, methylcellulose and polyvinyl alcohol. Rubber forming additives that can be used for the purpose of the invention include coumarin-indene resin, phenol-formaldehyde resin, xylene-formaldehyde resin, polyterpene resin, petroleum type hydrocarbon resin and rosin ester. Such an additive is added to active carbon typically by 0.5 to 5 wt % depending on the resin content.

The kneaded mixture of active carbon and resin is preferably shredded to several millimeters typically by means of a pin mill or a cutter mill in order to evenly supply the mixture to the molding machine for extrusion molding or pressure molding.

The kneaded mixture is most suitably be molded by extrusion molding or by pressure molding using a roll machine or a press machine. A plate-shaped preform may be produced by supplying the shredded mixture to a roll machine or filling a mold with the mixture and applying pressure to the mixture in the mold by means of a press machine. The preform may be made to show a uniform thickness and a smooth surface by molding it by means of a press machine and subsequently passing it through a roll machine. A pillar-shaped preform may be produced by means of an extrusion molding machine having a hole of a desired contour such as circle or rectangle.

The kneaded mixture is preferably combined with a reinforcement material in order to improve the mechanical strength of the molded product. The reinforcement material is preferably made of a polymeric material rather than metal in view of anti-corrosion effect. Typically, a sheet-shaped reinforcement material is sandwiched by a pair of sheet-shaped kneaded mixture of active carbon and resin. Alternatively, the kneaded and shredded mixture may be made to pass through a roll machine simultaneously with the sheet-shaped reinforcement material or a sheet-shaped reinforcement material may be laid on a layer of the kneaded and shredded mixture and another layer of the mixture may be laid on the reinforcement material so that the multilayer may be pressed by a press machine. A network of polyethylene or polypropylene fiber may suitably be used for such a sheet-shaped reinforcement material.

Plate-shaped or pillar-shaped preforms may be combined to form a desired honeycomb structure. For example, a honeycomb structure may be produced by laying flat preforms and corrugated preforms alternately or arranging square-tube-shaped preforms in a staggered fashion.

(4) Simultaneous Desulfurization and Dust Removal

With conventional dry desulfurization methods, the catalyst surface is basically held in a dry state and, if produced sulfuric acid (sulfur trioxide) is adsorbed by the catalyst surface, it would not make the entire surface wet with liquid. Due to this fact, the catalyst becomes eroded by soot contained in flue gas to consequently reduce the desulfurizing performance of the catalyst and the catalyst layer becomes clogged by soot and debris of the catalyst. Therefore, the catalyst can be protected against erosion and hence a degraded desulfurizing performance when the catalyst surface is constantly wetted by liquid. Additionally, ashes and soot contained in flue gas can be caught and removed efficiently by the cleansing effect of the liquid that wets the catalyst to prevent any clogging of the catalyst layer from taking place. Thus, in order to achieve this effect effectively, it is advantageous to make flue gas to flow downwardly through the catalyst layer and cleans the catalyst with dilute sulfuric acid continuously or intermittently.

While the catalyst and flue gas may be made to contact with each other, keeping the surface of the desulfurizing catalyst in a wet state, by flowing flue gas downwardly through the catalyst layer, some other method may be used to make the catalyst and flue gas contact with each other. For example, flue gas may be made to flow upwardly to form a fluidized bed of catalyst. However, it is assumed in the following description that flue gas is made to flow downwardly through the catalyst layer.

For the purpose of the invention, flue gas is made to flow through the catalyst layer in order to promote the down flow of liquid on the catalyst surface and improve the cleansing effect of liquid so that the ashes and soot caught by liquid may be made to quickly flow out of the tower. Additionally, when flue gas is made to pass through the catalyst layer rapidly, the flow rate of downwardly flowing liquid is raised and flue gas forms a turbulent flow to cause ashes and soot contained in flue gas to collide with the catalyst surface frequently so that the dust removing performance of the catalyst is improved. Considering the dust removing performance, the desulfurizing performance and the pressure loss, the actual flow rate of flue gas passing through the gaps of the catalyst is preferably between 3 and 15 m/s.

When flue gas contains sulfur dioxide gas and moisture to an enhanced concentration, dilute sulfuric acid is produced at a high rate on the catalyst surface to sufficiently wet the latter so that the above cleansing effect will be remarkable. If the concentration is relatively low, the catalyst layer is preferably cleansed with a cleansing solution (dilute sulfuric acid) continuously or intermittently. Such a cleansing solution is supplied to a high position above the catalyst layer and made to flow down through the layer and go out from the bottom of the layer. The collected cleaning solution may be brought back to the high position to circulate after removing the ashes and soot contained in it. Water may be sprayed onto the top of the catalyst layer in stead of flowing dilute sulfuric acid. If such is the case, sulfuric acid is constantly produced on the catalyst surface so that the liquid flowing out of the bottom of the catalyst layer will be an aqueous solution of dilute sulfuric acid. The rate of supplying a cleaning solution to the high position of the catalyst layer is preferably between 1 and 100 m$^3$/m$^2$/h (superficial velocity), more preferably between 5 and 20 m$^3$/m$^2$/h in terms of the flow rate of cleaning liquid flowing out from the bottom of the catalyst layer, although the rate may vary depending on the rate of producing dilute sulfuric acid on the catalyst surface and if the solution is supplied continuously or intermittently. If the moisture concentration in flue gas is lower as compared to sulfur dioxide gas, it is preferable that water is sprayed to increase the moisture concentration at an upstream stage of the catalyst layer. The dilute sulfuric acid flowing out from the bottom of the catalyst layer is preferably brought back to the high position above the catalyst layer so that the entire catalyst surface may be wet with dilute sulfuric acid.

While the above method may not be called a "dry method" because the entire catalyst surface is wet, it is basically a dry method because of the fact that sulfur dioxide gas is oxidized by oxygen that coexists with sulfur dioxide gas on the surface of the catalyst. This method is advantageous in terms of capital investment, running cost and required premises because the catalyst layer removes dust so that it eliminates the necessity of installing of a dust scrubber. The dust caught by the catalyst layer can be separated from the dilute sulfuric acid that flows out from the catalyst layer so that the dilute sulfuric acid can be reused after the separation. Otherwise, calcium carbonate may be directly added to the flowing out dilute sulfuric acid to catch the ashes and soot contained in it by means of gypsum. Since the catalyst layer is constantly held wet, it is free from fire hazards if an inflammable catalyst (e.g., active carbon) is used.

Now, the present invention will be described further by way of examples.

EXAMPLE 1

Commercially available coal based active carbon was baked at 800° C. for an hour in a flowing nitrogen atmosphere. 500 g of the obtained active carbon was crushed by means of a commercially available crusher and sorted out by means of a sieve vibrator comprising a stainless steel sieve (150 $\mu$m) which was operated for two hours to obtain fine particles of active carbon smaller than 150 $\mu$m. Then, a commercially available PTFE-dispersed solution (containing PTFE particles with a diameter between 0.2 and 0.4 $\mu$m by 60 wt %) was diluted by water to a PTFE concentration of ⅙ of the original concentration. Then, 111 g of the diluted PTFE-dispersed solution and 100 g of the above active carbon fine particles were mixed and kneaded for 10 minutes in a ceramic mortar with a diameter of 300 mm and the kneaded mixture was subjected to a molding process under pressure of 500 kgf/cm$^2$ in a compression molding machine to obtain an active carbon catalyst containing PTFE by 10 wt %. Then, the active carbon catalyst was dried at 45 to 50° C. for 12 hours and roughly crushed and sorted to obtain a granular active carbon catalyst with a grain diameter between 2.8 and 4.0 mm.

Then, the obtained active carbon catalyst was tested for its activity by flowing an aqueous solution of 5% dilute sulfuric acid through the catalyst layer at a rate of 200 mL/hr in a catalytic desulfurization reactor. More specifically, a glass-made reactor with an inner diameter of 16 mm and having a jacket was filled with 40 mL of the active carbon catalyst and gas with a composition of

| | |
|---|---|
| $SO_2$ | 800 volume ppm |
| $O_2$ | 4 volume % |
| $CO_2$ | 10 volume % |
| $N_2$ | balance |
| relative humidity | 100% | was made to flow therethrough at a rate of 600 dm$^3$/hr (SV=15,000 hr$^{-1}$) at 50° C. Then, the $SO_2$ concentration was observed at the exit by means of an $SO_2$ meter (UV type, IR type) to evaluate the activity of the catalyst. A sulfur dioxide removal efficiency of 42% was obtained 100 hours after the start of the test.

EXAMPLE 2

111 g of a diluted PTFE-dispersed solution same as that of Example 1 was added to 100 g of fine particles of active carbon obtained as in Example 1 and the mixture was kneaded by means of a kneader (capacity 400 mL, Z-type blade, 43 rpm, power 250 W) for 30 minutes. Then, the kneaded mixture was subjected to a molding process under pressure of 500 kgf/cm$^2$ to obtain an active carbon catalyst containing PTFE by 10 wt %. Then, the active carbon catalyst was dried at 45 to 50° C. for 12 hours and then roughly crushed and sorted to obtain a granular active carbon catalyst with a grain diameter between 2.8 and 4.0 mm. Then, the obtained active carbon catalyst was tested with the test method of Example 1 to obtain a sulfur dioxide removal efficiency of 47%.

EXAMPLE 3

111 g of a diluted PTFE-dispersed solution same as that of Example 1 was added to 100 g of fine particles of active carbon obtained as in Example 1 and the mixture was kneaded by means of a kneader (capacity 400 mL, Z-type blade, 43 rpm, power 250 W) for 30 minutes. Then, the kneaded mixture was subjected to a rolling process in a press roll machine (sequential rolling with respective inter-roll gaps of 3 mm, 2 mm, 1.5 mm and 1 mm) and the rolled mixture was roughly crushed and compression-molded under pressure of 500 kgf/cm$^2$ to obtain an active carbon catalyst containing PTFE by 10 wt %. Then, the active carbon catalyst was dried at 45 to 50° C. for 12 hours and then roughly crushed and sorted to obtain a granular active carbon catalyst with a grain diameter between 2.8 and 4.0 mm. Then, the obtained active carbon catalyst was tested with the test method of Example 1 to obtain a sulfur dioxide removal efficiency of 54%.

EXAMPLE 4

111 g of a diluted PTFE-dispersed solution same as that of Example 1 was added to 100 g of fine particles of active carbon obtained as in Example 1 and the mixture was kneaded by means of a kneader (capacity 400 mL, Z-type blade, 43 rpm, power 250 W) for 30 minutes. Then, the kneaded mixture was further kneaded in a 3-roll type mill (roll dimensions 63.5 φ×150 L, 84 rpm, 205 rpm, 500 rpm, power 400 W) for 15 minutes and compression-molded under pressure of 500 kgf/cm$^2$ to obtain an active carbon catalyst containing PTFE by 10 wt %. Then, the active carbon catalyst was dried at 45 to 50° C. for 12 hours and then roughly crushed and sorted to obtain a granular active carbon catalyst with a grain diameter between 2.8 and 4.0 mm. Then, the obtained active carbon catalyst was tested with the test method of Example 1 to obtain a sulfur dioxide removal efficiency of 66%.

EXAMPLE 5

222 g of a diluted PTFE-dispersed solution same as that of Example 1 was added to 200 g of fine particles of active carbon obtained as in Example 1 and the mixture was kneaded by means of a roll-type pressure kneader (capacity 500 mL, 20 rpm, power 2000 W) for 15 minutes. Then, the kneaded mixture was subjected to a molding process under pressure of 500 kgf/cm$^2$ to obtain an active carbon catalyst containing PTFE by 10 wt %. Then, the active carbon catalyst was dried at 45 to 50° C. for 12 hours and then roughly crushed and sorted to obtain a granular active carbon catalyst with a grain diameter between 2.8 and 4.0 mm. Then, the obtained active carbon catalyst was tested with the test method of Example 1 to obtain a sulfur dioxide removal efficiency of 68%.

EXAMPLE 6

Crushed active carbon obtained as in Example 1 was sorted out in a manner as described above in Example 1. Sieves with different meshes (0–25 μm, 20–53 μm, 53–106 μm, 106–212 μm, 212–300 μm, 2,800–4,000 μm) were used in combination to obtain six different specimens of fine particles of active carbon with different average particle diameters. 111 g of a diluted PTFE-dispersed solution same as that of Example 1 was added to 100 g of each of the six specimens of fine particles of active carbon and each of the mixtures was subjected to same procedures as those of Example 3 (kneading, molding, drying, rough crushing, sorting) to obtain so many different specimens of granular active carbon with a grain diameter between 2.8 and 4.0 mm containing PTFE by 10 wt %.

Figure 1:
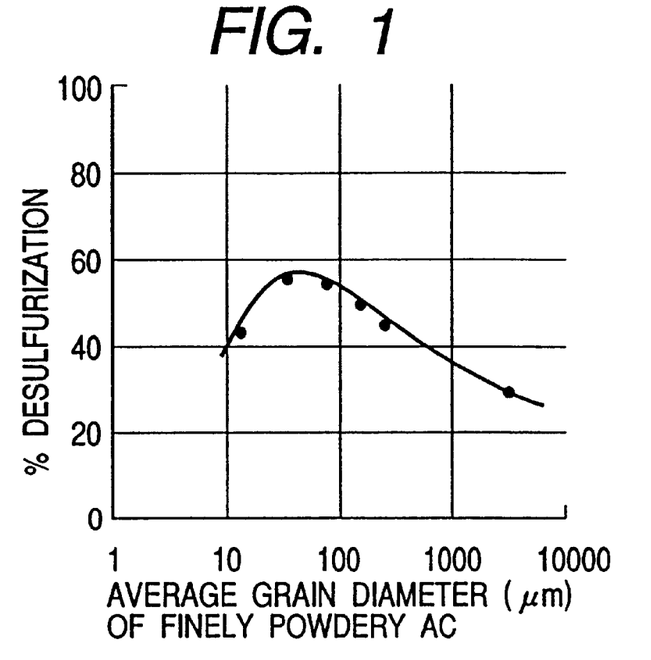
FIG. 1 is a graph showing the relationship between the average particle diameter of finely powdery active carbon and the desulfurization performance of a catalyst prepared therefrom according to the invention.

Then, each of the obtained active carbon catalysts was tested for activity with the method of Example 1. Table 1 and FIG. 1 show the desulfurizing performance of each of the specimens obtained 100 hours after the start of the test. From the obtained results, it will be seen that a high desulfurization efficiency is achieved when the average particle diameter of the fine particles of active carbon is found within a range between 12 and 600 μm, preferably between 20 and 200 μm.

TABLE 1

| average particle diameter of fine particles of active carbon (μm) | desulfurization efficiency (%) |
|---|---|
| 12.5 | 42 |
| 36.5 | 55 |
| 79.5 | 54 |
| 159 | 48 |
| 256 | 43 |
| 3,400 | 28 |

EXAMPLE 7 rushed active carbon obtained as in Example 1 was sorted out in a manner as described above in Example 1. Then, a commercially available PTFE-dispersed solution (containing PTFE by 60 wt %) was diluted by water to a PTFE concentration of ⅔ to 1/20 of the original concentration to obtain diluted PTFE-dispersed solutions containing PTFE by 3 to 40 wt %). Then, 111 g of each of the diluted PTFE-dispersed solutions was added to 100 g of the above active carbon fine particles and each of the mixtures was subjected to same procedures as those of Example 3 (kneading, molding, drying, rough crushing, sorting) to obtain so many different specimens of granular active carbon with a grain diameter between 2.8 and 4.0 mm containing PTFE by 0 to 30 wt %.

Figure 2:
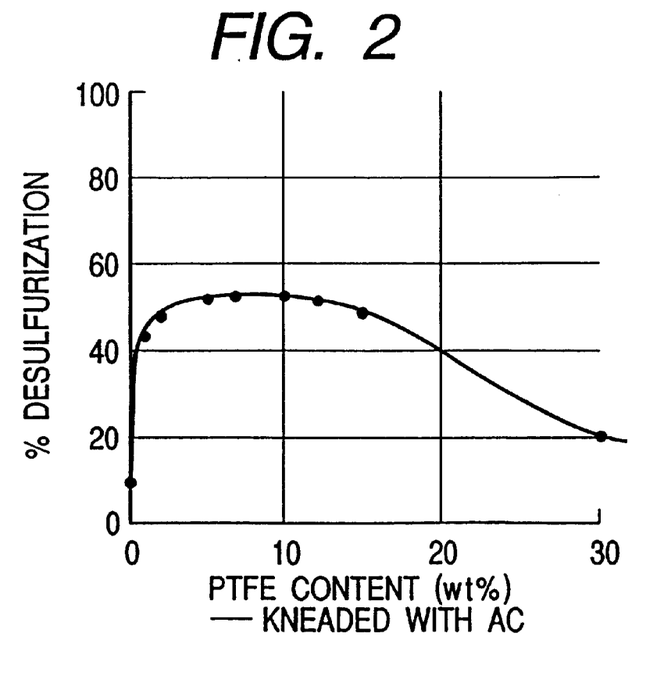
FIG. 2 is a graph showing the relationship between the content of PTFE kneaded with finely powdery active carbon and the desulfurization performance of a catalyst prepared therefrom according to the invention.

Then, each of the obtained active carbon catalysts was tested for activity with the method of Example 1. Table 2 and FIG. 2 show the desulfurization efficiency of each of the specimens obtained 100 hours after the start of the test. From the obtained results, it will be seen that a high desulfurizing rate is achieved when PTFE is added to active carbon fine particles by 0.5 to 25 wt %, preferably 1 to 20 wt %, before the mixture is kneaded.

TABLE 2

| PTFE content (wt %) | desulfurization efficiency (%) |
| --- | --- |
| 0 | 10 |
| 1 | 44 |
| 2 | 49 |
| 5 | 52 |
| 7 | 53 |
| 10 | 54 |
| 12 | 52 |
| 15 | 49 |
| 30 | 20 |

EXAMPLE 8

111 g of a diluted PTFE-dispersed solution same as that of Examples 1 was added to 100 g of fine particles of active carbon obtained as in Example 1 and the mixture was kneaded in a small crusher (mortar outer diameter 178 mm, 100 rpm, power 100 W) for 10 minutes. Then, the kneaded mixture was subjected to a molding process under pressure of 500 kgf/cm$^2$ to obtain an active carbon catalyst containing PTFE by 10 wt %. Then, the active carbon catalyst was dried at 45 to 50° C. for 12 hours and then roughly crushed and sorted to obtain a granular active carbon catalyst with a grain diameter between 2.8 and 4.0 mm. Then, the obtained active carbon catalyst was tested with the test method of Example 1 to obtain a desulfurization efficiency of 43%.

EXAMPLE 9

555 g of a diluted PTFE-dispersed solution same as that of Examples 1 was added to 500 g of fine particles of active carbon obtained as in Example 1 and mixed in a V-type bicylinder mixer (capacity 1,000 mL, 30 rpm) for 60 minutes and 100 g of the mixture was kneaded in a small crusher (mortar outer diameter 178 mm, 100 rpm, power 100 W) for 10 minutes. Then, the kneaded mixture is subjected to a molding process under pressure of 500 kgf/cm$^2$ to obtain an active carbon catalyst containing PTFE by 10 wt %. Then, the active carbon catalyst was dried at 45 to 50° C. for 12 hours and then roughly crushed and sorted to obtain a granular active carbon catalyst with a grain diameter between 2.8 and 4.0 mm. Then, the obtained active carbon catalyst was tested with the test method of Example 1 to obtain a desulfurization efficiency of 43%.

COMPARATIVE EXAMPLE 1

The procedures of Example 1 were followed except that the ingredients were mixed in a V-type bicylinder mixer for 60 minutes and visually confirmed that they had been mixed well instead of manually kneading them in a mortar. The obtained active carbon catalyst was tested for activity to find that the desulfurization efficiency was 18%. This proved that visual confirmation of the extent of mixing is not sufficient and application of shearing force is necessary to make the walls of the inter-particulate gaps water-repellent.

EXAMPLE 10

A rectangular reaction vessel having a cross section of 35 mm×40 mm was filled with a molded catalyst comprising plate-shaped catalysts arranged triangularly as shown in FIG. 4A or in parallel as shown in FIG. 4B (height 900 mm, pitch of plate arrangement 2 mm). The molded catalyst had been prepared by mixing powdery active carbon (coal type, average particle diameter 30 μm) and powdery Teflon (solution dispersed with particles with average particle diameter of 2,000 Å) to a ratio of 9:1 and kneading the mixture to mold into a sheet-shape preform with a thickness of 0.5 mm and applying it to the opposite side of a polypropylene network with a thickness of 0.3 mm to produce a multilayer product. Then, gas with composition listed below (45° C.) was made to flow through the reaction vessel filled with the catalyst at different flow rates.

| | |
| --- | --- |
| $O_2$ | 4% |
| $CO_2$ | 10% |
| $H_2O$ | saturated |
| $SO_2$ | 1,000 ppm |

Then, the reaction rate γ [mol/h] was obtained as the rate of removing $SO_2$ per hour from the difference of the $SO_2$ concentration at the entrance of the reaction vessel and the corresponding concentration at the exit of the reaction vessel. Then, the reaction rate constant k was obtained by means of the formula below.

$$\gamma = k \times C_{SO2}{}^n$$

($C_{SO2}$: $SO_2$ concentration [mol/m$^3$])

(n: constant)

Figure 5:
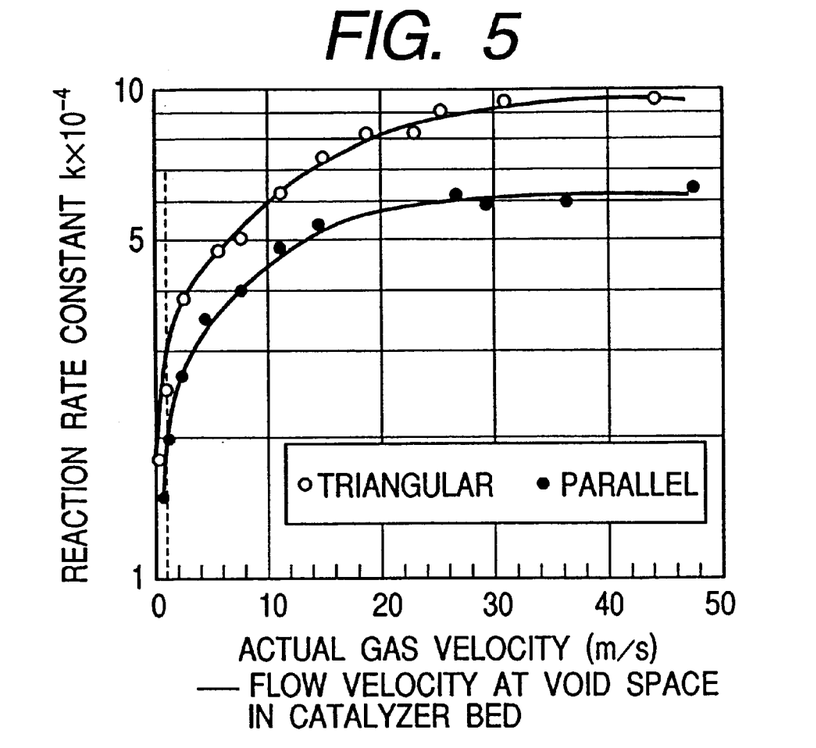
FIG. 5 is a graph showing the relationship between the flow rate of downwardly flowing gas and the reaction rate constant.

As seen from FIG. 5 showing the results of the experiments, the reaction rate constant increased as a function of the flow rate within a range of actual gas flow rate between 0.5 and 40 m/h.

COMPARATIVE EXAMPLE 2

Gas same as that of Example 10 was made to flow upwardly through a reaction vessel (triangular type) also same as that of Example 10 at a rate of 30 Nm$^3$/h to determine the reaction rate constant. A value of 3.5×10$^{-4}$ was obtained for k, which represents 73% of its counterpart of Example 10 where gas was made to flow downwardly.

EXAMPLE 11

Figure 6:
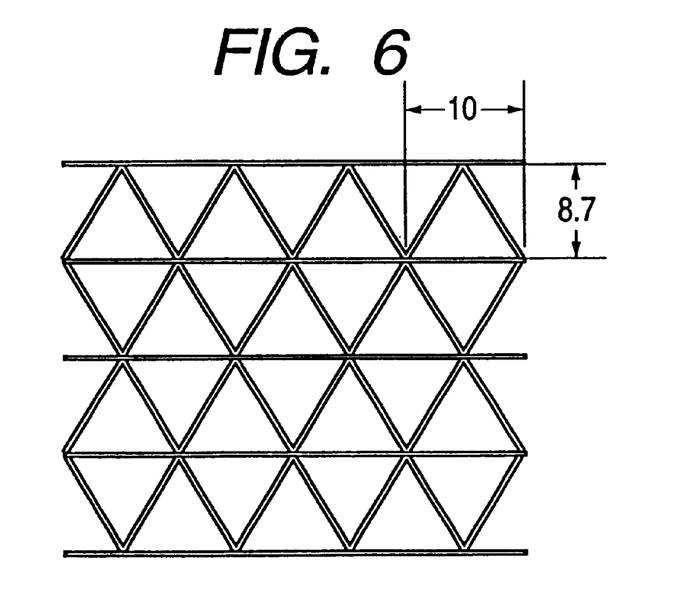
FIG. 6 is a schematic cross sectional view of a honeycomb structure prepared by using a plate-like catalyst as shown in FIG. 3.

Powdery active carbon (coal type, average particle diameter 30 μm) and powdery fluororesin (PTFE-dispersed solution with average particle diameter of 200 nm, 60 wt %) were mixed to a ratio of 9:1 and the mixture was kneaded in a kneader. Thereafter, the kneaded mixture was molded into a sheet-shape preform with a thickness of 0.5 mm by means of a roll machine. The sheet was then applied to the opposite sides of a polypropylene network with a thickness of 0.3 mm to produce a plate-shaped catalyst. A number of similar catalysts were prepared and some of them were corrugated. Then, flat plates and corrugated plates were laid alternately to produce a honeycomb structure as shown in FIG. 6.

EXAMPLE 12

Powdery active carbon (coal type, average particle diameter 30 μm) and powdery fluororesin (PTFE-dispersed solution with average particle diameter of 200 nm, 60 wt %) were mixed to a ratio of 9:1, to which methylcellulose was added as additive by 1 wt % relative to said active carbon, and the mixture was kneaded in a kneader. Thereafter, the kneaded mixture was molded into a sheet-shape preform with a thickness of 0.5 mm by means of a roll machine. The sheet was then applied to the opposite sides of a polypropylene network with a thickness of 0.3 mm to produce a plate-shaped catalyst. A number of similar catalysts were prepared and some of them were corrugated. Then, flat plates and corrugated plates were laid alternately to produce a honeycomb structure as shown in FIG. 6.

EXAMPLE 13

A pair of rectangular reactor vessels having a cross section of 35 mm×40 mm were filled with the respective honeycomb structures obtained in Examples 11 and 12 and gas (45° C.) having a composition as shown below was made to flow therethrough downwardly at a superficial gas flow rate of 4 m/s.

| | |
|---|---|
| $SO_2$ | 800 volume ppm |
| $O_2$ | 4 volume % |
| $CO_2$ | 10 volume % |
| $N_2$ | balance |
| relative humidity | 100% |

Then, the reaction rate γ [mol/h] was obtained as the rate of removing $SO_2$ per hour from the difference of the $SO_2$ concentration at the entrance of the reaction vessel and the corresponding concentration at the exit of the reaction vessel. Then, the reaction rate constant k was obtained by means of the formula below.

$$\gamma = k \times C_{SO2}^n$$

($C_{SO2}$: $SO_2$ concentration [mol/m³])
(n: constant)

As a result, reaction rate constants of $5.2 \times 10^{-4}$ and $5.0 \times 10^{-4}$ were obtained respectively for the catalysts or Examples 11 and 12.

EXAMPLE 14

The active carbon catalyst prepared in Example 1 was tested for its activity in a catalytic desulfurization reactor. More specifically, a glass-made reactor with an inner diameter of 16 mm and having a jacket was filled with a 40 mL of the active carbon catalyst and gas with a composition of

| | |
|---|---|
| $SO_2$ | 650 volume ppm |
| $O_2$ | 4 volume % |
| $CO_2$ | 10 volume % |
| $N_2$ | balance |
| relative humidity | 100% | was made to flow therethrough at a rate of 400 L/h at 50° C., while a solution obtained by adding water to the produced dilute sulfuric acid was made to flow from the top of the reaction vessel at a rate of 0.2 L/h. Additionally, fly ash (average particle diameter 5 μm) obtained from a coal burning power generation plant was added to the above mixture gas at a rate of 100 mg/m³ immediately before the entrance of the reaction vessel.

Then, the $SO_2$ concentration was observed at the exit by means of an $SO_2$ meter (UV type) to evaluate the activity of the catalyst. A sulfur dioxide removal efficiency of 69% was obtained 100 hours after the start of the test. After the test, the recovered sulfuric acid was filtered to isolate the solid component (except active carbon and PTFE), the weight of which was measured. As a result, it was found that 93% of the supplied fly ash had been removed at the end of the test continued for 100 hours. The test was continued for another 1,000 hours. At the end of the test, it was found that the desulfurizing rate had not been degraded significantly.

What is claimed is:

1. An active carbon catalyst comprising powdery active carbon and fluororesin and containing gaps formed between particles of said powdery active carbon, the peripheral wall of said gaps being made water repellant so that discharge of the produced sulfuric acid from the gaps is promoted, the water repellency having been realized by applying shearing force to the powdery active carbon and particles of the fluororesin so that the particles of the fluororesin are deformed.

2. An active carbon catalyst according to claim 1, wherein said powdery active carbon has an average particle diameter between 12 and 600 μm, wherein said fluororesin is contained in an amount of 0.5 and 25 wt % relative to said powdery active carbon, and wherein said mixing and kneading operation was conducted by adding a liquid dispersion of the particles of the fluororesin to the powdery active carbon.

3. An active carbon catalyst according to claim 2, wherein said powdery active carbon has an average particle diameter between 20 and 200 μm.

4. An active carbon catalyst accordingly to claim 1, wherein said powdery active carbon is made from coal.

5. An active carbon catalyst according to claim 1, wherein said catalyst comprises a molded body having a predetermined profile, said molded body being composed of the powdery active carbon and the fluororesin.

6. An active carbon catalyst according to claim 5, wherein said molded body is further composed of a reinforcing material.

7. An active carbon catalyst according to claim 5, wherein said catalyst has a honeycomb structure formed of the molded body.

8. A method of manufacturing an active carbon catalyst having a honeycomb structure according to claim 7, comprising steps of mixing and kneading powdery active carbon and fluororesin particles so that the fluororesin particles are deformed, molding the kneaded mixture into a plate-like or pillar-like preform, and forming the honeycomb structure from the preform.

9. A method according to claim 8, wherein said molding step includes combining a reinforcing material with the kneaded mixture.

10. An active carbon catalyst according to claim 5, wherein said molded body was subjected to immersion in or spraying with a liquid dispersion of fluororesin particles for realizing an enhanced level of water repellency.

11. A method of flue gas desulfurization by bringing an active carbon catalyst according to any of claims 1 through 7 into contact with flue gas containing sulfur oxides, oxygen and moisture, causing the sulfur oxides in the flue gas to be adsorbed by said active carbon catalyst, oxidizing the sulfur oxides into sulfuric acid, and recovering and removing the produced sulfuric acid that is expelled from the catalyst due to the water repellency.

12. A method according to claim 11, wherein the flue gas is forced to flow downwardly.

13. A method according to claim 12, wherein said active carbon catalyst has a surface running in parallel with the flow direction of flue gas.

14. A method according to claim 13, wherein said surface is cleansed by an aqueous solution of sulfuric acid with a concentration not greater than 20 wt %.

* * * * *